(12) United States Patent
Schaefer et al.

(10) Patent No.: US 7,813,463 B2
(45) Date of Patent: Oct. 12, 2010

(54) TRAPPING AND STORAGE OF FREE THERMAL NEUTRONS IN FULLERENE MOLECULES

(75) Inventors: Daniel Richard Schaefer, P.O. Box 171, Union, OH (US) 45322-0171; James Michael Snead, 4236 Straight Arrow Rd., Beavercreek, OH (US) 45430-1519

(73) Assignees: Daniel Richard Schaefer, Union, OH (US); James Michael Snead, Beavercreek, OH (US)

(*) Notice: Subject to any disclaimer, the term of this patent is extended or adjusted under 35 U.S.C. 154(b) by 2107 days.

(21) Appl. No.: 09/996,244

(22) Filed: Nov. 28, 2001

(65) Prior Publication Data

US 2002/0037066 A1    Mar. 28, 2002

(51) Int. Cl.
    *G21B 1/00*    (2006.01)
(52) U.S. Cl. .................. 376/100; 376/317; 250/493.1
(58) Field of Classification Search ............. 376/100, 376/317; 250/493.1; 315/500; 423/445
    See application file for complete search history.

(56) References Cited

U.S. PATENT DOCUMENTS

| 4,935,623 | A | 6/1990 | Knauer |
| 5,248,498 | A | 9/1993 | Neumann et al. |
| 5,300,203 | A | 4/1994 | Smalley |
| 5,350,569 | A | 9/1994 | Coppa |
| 5,356,872 | A | 10/1994 | Eidelloth et al. |
| 5,364,568 | A | 11/1994 | Pope et al. |
| 5,364,993 | A | 11/1994 | Zhang et al. |
| 5,370,855 | A | 12/1994 | Gruen |
| 5,372,798 | A | 12/1994 | McConnachie et al. |
| 5,466,430 | A | 11/1995 | Castleman, Jr. et al. |

FOREIGN PATENT DOCUMENTS

WO    93/15768    8/1993

OTHER PUBLICATIONS

Handbook of Chemistry and Physics, 43 Edition, Hodgeman et al, Pub by The Chemical Rubber Pub. Co. Cleveland, Ohio. pp. 450-469, 472, 473, 478-483, 488, 489, 494, 495, 500, 501, 1961.*
Nucleonics, p. 70, Feb. 1961.*
Newmann, et al., Coherent Quasielastic Neutron Scattering Study of the Rotational Dynamics of C60 in the Orientationally Disordered Phase, *Physical Review Letters*, vol. 67, No. 27, pp. 3808-3811 (1997).
Kosvintsev et al., *Instruments and Experimental Techniques*, vol. 20, No. 1, p. 7.1, pp. 43-45 (1977).
Boltz et al., *CRC Handbook of Tables for Applied Engineering Science*, published by The Chemical Rubber Co., p. 390 (1970).
Dubbers, *CONF-9101110*, pp. 369-375 (1991).
Bellotti, *Nuclear Physics*, A 527, pp. 809c-816c (1991).
Krishnaswamy et al., Fortschritte Der Physik, *Progress of Physics*, pp. 25-34 (1983).
Jimenez-Vasquez et al., Hot-Atom Incorporation of Tritium Atoms into Fullereness, *Chemical Physics Letters*, 229, pp. 111-114 (Oct. 21, 1994).
Kikuchi et al., Encapsulation of Radioactive $^{159}$gD and $^{161}$Tb Atoms in Fullerene Cages, *J. Am. Chem. Soc.*, 116, pp. 9775-9776 (1994).
Braun et al., Endohedral Incorporation of Argon Atoms into $C_{60}$ by Neutron Irradiation, *Chemical Physics Letters*, 237, pp. 443-447 (May 19, 1995).
Fullerene Radiopharmaceuticals! High *Flux Neutron Irradiation Study of $C_{60}$, Electrochemical Society Proceedings*, vol. 95-10, pp. 66-71 (May 16-21, 1995).
Lindstrom et al., Analytical Applications of Cold Neutron Capture and Opportunities for Nuclear Physics, *Analytical Application of Cold Neutron Capture and Opportunities for Nuclear Physics* pp. 955-961 (1993).
Lindstrom et al., Measuring Hydrogen by Cold-Neutron Prompt-Gamma Activation Analysis, *Journal of Radioanalystical and Nuclear Chemistry Articles*, vol. 181, No. 2, pp. 271-275 (1994) (received Jan. 4, 1994).
Curl et al., Fullerenes, *Scientific American*, pp. 54-63 (Oct. 1991).
Niedemeyer et al., Simultaneous Observation of Muonium and Multiple Free Radicals in Muon-Implanted $C_{70}$, *Physical Review B, The American Phy. Soc.*, vol. 47, No. 16, pp. 10923-10926 (1993).
Percival et al., The Structure of $C_{60}$MU and Other Fullernenyl Radicals, *Chem. Physics Letters*, vol. 196, No. 3, 4, pp. 317-320 (Aug. 1992).
Estreiches et al., Stable and Metastable States of $C_{60}$H: Buckminsterfullerene Monohydride, *Chem. Physics Letters*, vol. 196, No. 3,4, pp. 311-316 (Aug. 1994).
Chemically Modified Fullerenes, *Physics & Chemistry of Fullerenes*, pp. 190-192, Reprint collection edited by Stephens.
Hawkins et al., Crystal Structure of Ormylated $C_{60}$: Confirmation of Soccer Ball Framework, *The American Assoc. for the Advancement of Science*, pp. 193-194. (1991).
Fagan et al., The Chemical Nature of Buckminsterfullerene ($C_{60}$) and the Characterization of a Platinum Derivative, *The American Assoc. for the Advancement of Science*, pp. 195-196 (1991).
Suzuki et al., Systematic Initiation of Buckminsterfullerene $C_{60}$: Synthesis of Diphenyl Fulleroids $C_{61}$ to $C_{66}$, *The American Assoc. for the Advancement of Science*, pp. 197-199 (1991).

* cited by examiner

*Primary Examiner*—Rick Palabrica
(74) *Attorney, Agent, or Firm*—Thompson Hine LLP

(57) ABSTRACT

A fullerene molecule having one or more free thermal neutrons trapped within the fullerene molecule and a method for trapping and storing neutrons within a fullerene molecule are described.

6 Claims, No Drawings

TRAPPING AND STORAGE OF FREE THERMAL NEUTRONS IN FULLERENE MOLECULES

BACKGROUND OF THE INVENTION

The present invention relates to the entrapment and isolation of free thermal neutrons within the hollow cage-like structure of fullerenes.

Fullerenes are large molecules of carbon in the form of a hollow geodesic dome containing 32 to several hundred carbon atoms. Fullerenes containing 60 carbons ($C_{60}$), better known as Buckminsterfullerene or "buckyballs," are extremely stable. The $C_{60}$ fullerene has an icosohedral symmetry consisting of 12 five-numbered rings and 20 six-membered rings and resembles the patchwork faces of a soccer ball. Another fullerene ($C_{70}$) which is also very stable contains 25 six-membered rings and has a shape resembling a rugby ball.

Studies of fullerenes indicate that this material exhibits a remarkable range of physical and chemical properties. For example, fullerenes have high thermal and mechanical stability, and have been generated with atoms other than carbon replacing some of the carbon atoms in the cage structure itself. Fullerenes also exhibit regenerative properties so that, in the event of a rupture in the molecule, it will reclose.

Free neutrons, while relatively easy to produce and even isolate, are extremely difficult, if not impossible to trap and store in significant numbers for use outside the neutron generator. Neutrons are subatomic particles belonging to the class called baryons. They have a rest mass of 1.009 atomic mass units (AMU) and no electric charge. Neutrons are a constituent of the nucleus of all atoms except simple hydrogen, the number of neutrons present being the difference between the mass number and the atomic number of the element. Neutrons may be liberated from the nucleus of various elements, particularly uranium-235 and plutonium-239. They can also be produced by bombardment of other elements, e.g., beryllium, with charged particles.

High energy neutrons such as those emitted by the fission of a uranium-235 nucleus in a nuclear reactor are called "fast" neutrons. In the reactor these fast neutrons are slowed down by collisions with the nuclei of the atoms of the reactor's moderator, typically, water or graphite. When a sufficient number of collisions have slowed the neutrons to an energy equal to the thermal energy of the moderator, the neutrons are called "thermal" neutrons.

While various atoms and ions have been encapsulated within a fullerene cage, there are no known procedures for encapsulating neutrons within a fullerene molecule.

The only previously known procedure for trapping free neutrons is a method in which a small number of neutrons are trapped using a specially designed neutron trap operating near absolute zero temperature. The very small number of neutrons and the extremely low temperature requirement severely restrict the ability to use this method for other than very limited scientific investigation. There is no known procedure for trapping and isolating neutrons within a molecule. Accordingly, there exists a need to be able to easily and economically trap and store free thermal neutrons for use in other applications such as scientific, medical and engineering, to name a few, at a location away from the interior of a nuclear reactor or other neutron generator.

SUMMARY OF THE INVENTION

Thermal neutrons are generated from various elements such as uranium-235 and plutonium-239, e.g., in a fission reaction in the core of a nuclear reactor; in a particle accelerator which generates free neutrons via charged particle bombardment of a suitable material that, with moderation, produces free thermal neutrons; or via charged particles emitted from a radionuclide source bombarding a suitable target material. In accordance with the present invention, the free thermal neutrons are used to irradiate fullerenes which, upon exposure, trap or adduct the neutrons within the molecular cage of the fullerene molecule. After exposure, the neutrons can remain confined within the fullerene molecule until they are released; they can decay into protons while emitting beta particle radiation and anti-neutrinos, oscillate into anti-neutrons via naturally occurring neutron/anti-neutron oscillation with the subsequent natural decay of anti-neutrons into anti-protons while emitting positrons and neutrinos; or they can bind with protons to form deuterium and/or tritium nuclei or a mixture of deuterium and tritium. The experimentally derived neutron decay half life, based upon experimentation undertaken in conjunction with the development of the present invention, is approximately ten minutes. This value closely agrees with published theoretical and experimental values. In a preferred embodiment, the invention relates to a $C_{70}$ fullerene molecule having one or more free thermal neutrons encapsulated within the cage-like structure of the fullerene molecule such that the free thermal neutrons are capable of being released from the fullerene at a location removed from the source of the neutrons by disassembling the fullerene molecule using a laser, an electric field, magnetic field, non-coherent electromagnetic radiation, particle bombardment, pressurization, mechanical force, heat, chemical reaction, electric current, or by using any combination of such means. The neutron-containing or similar substance fullerene can also be made to impinge upon a thin metal foil which prevents penetration by the fullerene molecule but allows the neutron to pass through.

It is a particular object of the present invention to provide a fullerene molecule containing, within its cage-like structure, one or more neutrons, and to further provide a method for obtaining a relatively large quantity of encapsulated neutrons.

DETAILED DESCRIPTION

The present invention relates to a fullerene having one or more free thermal neutrons entrapped within the cage-like structure of the fullerene molecule and to a method for trapping and storing neutrons within the fullerene molecule. Fullerenes are large hollow molecules containing an even number of carbon atoms from about 32 to several hundred. In carrying out the present invention, fullerenes containing greater than about 30 carbons are preferred and about 60 to 84 are highly preferred with about 60 to 70 being especially preferred. Excellent results have been obtained using fullerenes containing 70 carbon atoms. Fullerenes are commercially available, e.g., from SES Inc., Houston, Tex.

The free thermal neutrons are entrapped and isolated within the molecular cage of a fullerene, and the neutron-containing fullerenes may then be stored outside the nuclear reactor or other source of the neutrons in a suitable container. In order to encapsulate the neutrons within the fullerene molecule, the molecule can be irradiated at a variable neutron flux for a variable period of time at a temperature effective to trap and store the neutrons within the fullerene molecule. It is believed that satisfactory results can be obtained by irradiating the fullerene molecule in a thermal neutron flux at a steady-state thermal power of about 10 to 500 kilowatts for about 5 to 15 minutes. Typically, the neutrons are captured in the fullerene molecules at ambient temperatures; however, the efficiency of trapping free thermal neutrons within the fullerene molecule can be governed by controlling the temperature of the fullerene molecule, depending on the energy of the neutrons and the particular fullerene employed as well as other specific requirements involved. Theoretically, the temperature can range from near absolute zero to the temperature at which the fullerene ruptures. A neutron will remain entrapped within the fullerene molecule until such time that it naturally decays into a proton or combines with a proton to form deuterium and/or tritium, or until the fullerene molecule is made to release the neutron, e.g., by rupturing the fullerene molecule with a laser beam, or other means of opening the fullerene molecule, or until the neutron transforms into an anti-neutron via natural neutron/anti-neutron oscillation with subsequent decay of the anti-neutron into an anti-proton and a neutrino. The rate of transformation of the trapped neutron to an anti-neutron via neutron/anti-neutron oscillation may be increased by raising the temperature of the fullerene molecule, or decreased by lowering the temperature of the fullerene molecule.

The encapsulated free thermal neutrons of the present invention may be accelerated to energy levels that do not occur naturally by placing an electrical charge on the fullerene molecule and then accelerating the charged molecule containing the neutron(s) in a particle accelerator. The neutrons can then be released from the fullerene molecule by disassembling or trapping the molecule thereby releasing a uniform beam of very high energy neutrons.

The encapsulated free thermal neutrons can be used in a variety of applications such as an analytical tool to identify and measure contaminants in materials. They can be employed as a basis for building neutron microscopes wherein the very atoms of materials may be observed and, since fullerene molecules are not considered to be a health hazard, the fullerene-encapsulated neutrons may be used in a whole myriad of medical and surgical applications. The trapped neutrons may find wide applications in environmental science, e.g., they may be used to convert hazardous materials into non-hazardous materials, etc. Also the fullerene molecules can be employed to trap and precisely position free thermal neutrons for use as irradiation targets for other particles.

In accordance with the invention, the method for producing the neutron-containing fullerene comprises irradiating the fullerene molecules using a source of free thermal neutrons, e.g., in the fission reaction occurring in the core of a nuclear reactor, via a particle accelerator which generates free neutrons via charged particle bombardment of a suitable target material such as beryllium, or from an isotopic source where the free neutrons are generated via charged particles emitted from a radionuclide source bombarding a suitable target material, etc.

The free neutron-containing fullerenes and the method for obtaining the free neutron-containing fullerenes of this invention are described with reference to the following detailed Example.

Example

An irradiation vial such as a snap-top polyethylene or other polymeric vial is cleaned by immersing the vial in a bath of 100% ethyl alcohol, making sure that the vial is filled and completely immersed in the alcohol for a period of at least 10 minutes. The vial is removed using tweezers or other means which have been cleaned with ethanol and dried in an oven such as an electrically heated convention oven at a temperature of between about 70 and 80° C.

After drying, the vial is allowed to return to room temperature at which time it is weighed using, e.g., a Mettler HL-52 Digital Balance (or the equivalent) to obtain the mass of the empty vial within the limit of the balance accuracy (about 0.01 mg for the HL-52)

Using surgical rubber gloves, the fullerene sample is placed in the cleaned, weighed irradiation vial, taking care to remove any extraneous material adhering to the outside of the vial.

The filled irradiation vial is then placed into one of the Rabbit system carrier tubes of a nuclear reactor and irradiated at a steady-state thermal power of between 10 and 500 kilowatts for a period of time of about 5 to 15 minutes.

Analysis of the neutron-containing fullerene is performed according to the following procedure.

1. Immediately upon removal of the sample from the irradiation facility, the irradiated fullerene sample is poured into a metal planchet suitable for both beta and gamma counting.

2. A series of beta counts is performed using a BC-4 gross beta counter. Counting starts within 2-3 minutes of removal of the sample from the neutron flux. Counts are 30 seconds in duration, and are repeated every 2 minutes. The clock time of each count is recorded along with the total beta counts detected. This series of counts proceeds for 12 minutes.

3. After the initial set of the counts has been completed, a gamma spectrographic analysis is performed on the irradiated sample. The gamma counts are done with a high resolution gamma spectroscopy system based on a germanium detector. Counting time is about one minute in duration. After gamma counting is completed, the sample is returned to the beta counter.

4. Beginning about 20 minutes after removal of the sample from the reactor, the counts described in step 2 above are repeated.

5. A gamma spectrographic analysis is performed again after this set of counts is completed. Counting time for gamma analysis may be increased proportionately to allow for decay of short-lived radionuclides.

6. The process of beta counting and gamma counting is repeated at future times. Only a single beta count is done once the second set of counts is completed. A gamma count is done after each beta count.

7. Depending on isotopes detected after each gamma count, the process is extended over several days for half-life stripping and analysis.

8. Gamma spectrographic analysis results are reviewed to determine the most likely point at which neutron decay information might be discernible. Generally, if Al-28 is detected in the gamma count done in step 3 above, the initial set of beta counts must be discarded. Thus, data obtained in step 4 marks the initial set of results.

9. Using data taken at the longest decay periods (i.e., the time longest after sample removal), interfering gamma emission counts are "stripped" from earlier data using known half-life data, and the proportions of isotopes detected in the gamma analyses.

10. After all interfering emissions are stripped, the data taken at earlier decay times is examined for evidence of single decay curve emissions. This is generally done by plotting stripped data in semi-long form looking for linear sections of the curve. These linear regions are fit to first-order equations using the method of least-squares. Results obtained are compared with listed values for unbound neutron lifetime, and with decay period information to assure that signal-to-noise conditions are within reason.

Evidence that neutrons are trapped in the fullerene molecule consists of the presence of a pure beta emitter in the fullerene that remains after the counts resulting from the gamma emitters have been stripped from the raw data. The pure beta emitter has a half life of about ten minutes. There are very few pure beta particle emitters with a half life anywhere near ten minutes. The rarity of these pure beta emitters, their chemical nature, and the chemical nature of the fullerene all point to the conclusion that they cannot be the source of the pure beta emitter observed in the irradiated fullerene. The only other possible source of the radiation is the decay of free neutrons.

While the foregoing product and method herein described constitutes preferred embodiments of the present invention, it is to be understood that the invention is not so limited and that other embodiments and changes may be incorporated herein without departing from the scope of the invention.

What is claimed is:

1. A fullerene molecule having one or more free thermal neutrons trapped within the cage-like structure of said fullerene molecule.

2. The fullerene molecule of claim 1 wherein said fullerene molecule contains greater than about 30 carbon atoms.

3. The fullerene molecule of claim 2 wherein said fullerene molecule contains about 60 to 70 carbon atoms.

4. The fullerene molecule of claim 1 wherein the molecule is characterized in that it is a beta particle emitter, the beta particle emitter having a half life of about 10 minutes.

5. The fullerene molecule of claim 3 wherein said fullerene contains about 70 carbon atoms.

6. The fullerene molecule of claim 1 wherein said one or more thermal neutrons are trapped within said fullerene molecule by a method which comprises irradiating said fullerene molecule in a nuclear reactor under a thermal neutron flux at a steady-state thermal power of about 10 to 500 kilowatts for about 5 to 15 minutes.

* * * * *